United States Patent [19]
Virzi et al.

[11] Patent Number: 5,134,613
[45] Date of Patent: Jul. 28, 1992

[54] TWO PARETY MEMORY ACCESS ARBITRATOR

[75] Inventors: John D. Virzi, Bronx; Rajiv Deshmukh, Massapequa Park, both of N.Y.

[73] Assignee: Standard Microsystems Corporation, Hauppauge, N.Y.

[21] Appl. No.: 540,901

[22] Filed: Jun. 20, 1990

[51] Int. Cl.$^5$ .................................................. H04J 3/02
[52] U.S. Cl. .................................. 370/85.6; 340/825.5
[58] Field of Search .................... 370/85.6; 340/825.5; 364/200, 900

[56] References Cited

U.S. PATENT DOCUMENTS 4,819,229 4/1989 Pritty et al. .......................... 370/85.6
4,858,112 8/1989 Puerzer et al. ......................... 370/16

Primary Examiner—Benedict V. Safourek
Assistant Examiner—Min Jung
Attorney, Agent, or Firm—Hopgood, Calimafde, Kalil, Blaustein & Judlowe

[57] ABSTRACT

A controller for use in a local area network includes an arbitration circuit that permits data communication between a processor and a buffer memory associated with the controller to take priority over data communication between controller and buffer memory. The arbitration circuit interrupts a controller-initiated read or write cycle upon the receipt of a read or write memory access request from the processor.

6 Claims, 3 Drawing Sheets

TWO PARETY MEMORY ACCESS ARBITRATOR

BACKGROUND OF THE INVENTION

The present invention relates generally to data communication, and more particularly to data communication in a local area network.

It has long been a common practice to interconnect a plurality of digital computers or data processors (CPUs) via a cable in a network so that data can be transferred between the processors in the network. Networks of this type, generally known as local area networks (LANs), may include a token-passing network in which a token is transferred or passed between processors to allow only that processor which then has possession of the token to transmit data to a designated other processor in the network so long as the transmitting processor retains the token.

Each processor in the network includes a local area network (LAN) controller, which is connected, typically through a LAN driver, to the cable by which the processor is interconnected with the other processors in the network. Also, typically associated with each processor in the network is a buffer memory, typically a random-access memory (RAM), which temporarily stores data either received, via the controller, from an external processor to be subsequently transferred into the processor's main memory, or data from the processor that is to be transmitted along the cable to an external processor also via the network controller.

The buffer memory is thus shared by the processor and its local area network controller. In order to transmit data from one processor to another processor along the network, the data from the transmitting processor is first loaded into its resident buffer memory. The LAN controller associated with the transmitting processor then reads the data thus stored in the buffer memory and transmits that data on the cable to a designated receiving processor. The LAN controller associated with the receiving processor receives this transmitted data and then loads that data into its own resident buffer memory from which the transmitted data is then read into the main memory of the receiving processor.

Since access by the LAN controller and the processor to the buffer memory are asynchronous, some form of arbitration scheme is generally provided to control access to the buffer memory between the associated processor and LAN controller so as to prevent access contention to the buffer memory.

For this purpose, the LAN controller typically includes an arbitration circuit, which, through the generation of appropriate timing signals, allocates access to the buffer memory between data being received from or transmitted to an external processor, via the LAN controller, and data either received from or being sent to its local processor via the PC bus. A typical LAN controller that includes such an arbitration circuit is the COM90C65 made and sold by Standard Microsystems Corp. of Hauppauge, N.Y.

In the conventional arbitration circuit, such as that included in the COM90C65 LAN controller, allocation of access to the buffer memory between the processor and the LAN controller is assigned to that unit which first requests access to the memory. That is, if access to the buffer memory is requested by the processor prior to the LAN controller, the latter must wait until the request from the processor has been completed. Conversely, if the LAN controller requests access to the buffer memory before the processor, the processor must wait for access to the buffer memory pending the completion of data transmission by the LAN controller to or from the buffer memory. On those rare occasions when both the processor and LAN controller simultaneously request access to the memory, the processor is given priority over the LAN controller to the buffer memory.

In the past, when processors and buffer memories operated at relatively low speeds, placing the processor into a wait state while the buffer memory serviced a request from a LAN controller had only minimal and consequently acceptable adverse impact on overall network performance. However, as the operating speeds of memories and processors have increased in recent years, this method of arbitration has become increasingly disadvantageous since it tends to decrease overall network throughput in those faster systems by forcing the processor to remain in a wait state for access to the resident buffer memory until a LAN controller request to the buffer memory is completed. In the higher-speed networks, access for an uncontested read of the buffer memory is typically 400 ns as compared to an access period of 1400 ns for a processor required to read from the buffer memory when the processor is forced to wait for the completion of a LAN controller access to the memory.

In one attempt to improve network throughput and operating speed, the buffer memory has been implemented as an external dual port static RAM. In this scheme, the processor directly accesses one port of the buffer memory rather than use the arbitration circuit within the LAN controller, while the LAN controller accesses the second port of the buffer memory by using the arbitration circuit. Although this scheme improves throughput and eliminates memory contention, the cost of dual port static RAMS is higher than that of conventional single-port static RAMS so that this design is not cost effective. To reduce the cost of implementing this scheme, a dual port static RAM along with the LAN controller could be fabricated on a single integrated circuit. However, the amount of circuitry and silicon needed to implement the dual port static RAM in this manner would far exceed that of a conventional static RAM combined with the arbitration circuit since a dual port static RAM requires twice the number of bit lines, word lines, select devices and sense amplifiers than required for a conventional static RAM. This approach to achieving increased operating speed is thus also not practical.

It is accordingly an object of the present invention to provide an improved LAN controller arbitration scheme in which system throughput and increased operating speed are achieved.

It is a further object of the present invention to provide an arbitration scheme in a LAN controller that more efficiently arbitrates access to and from a shared buffer memory.

It is another object of the present invention to provide an improved arbitration scheme of the type described without the need for a more costly and more complex dual port static RAM.

It is a general object of the present invention to provide a more efficient arbitration scheme for use in a LAN controller which is cost effective and practical.

It is still a further object of the present invention to provide an arbitration circuit for use with a LAN controller and buffer memory which speeds up loading or reading from the memory by the processor.

SUMMARY OF THE INVENTION

In the memory arbitration circuit of the present invention, the processor is allowed access to the buffer memory without waiting by giving the processor absolute priority to the buffer memory. Access to the buffer memory by the LAN controller is postponed until the processor access is completed, and access from the controller to the memory is interrupted or preempted upon the onset of a processor access request.

DESCRIPTION OF THE DRAWINGS

To the accomplishment of the above and such further objects as may hereinafter appear, the present invention relates to an improved arbitration scheme for use in a LAN controller substantially as defined in the appended claims and as described in the following specification considered with the accompanying drawings, in which:

DETAILED DESCRIPTION OF A PREFERRED OR SPECIFIC EMBODIMENT

Figure 1:
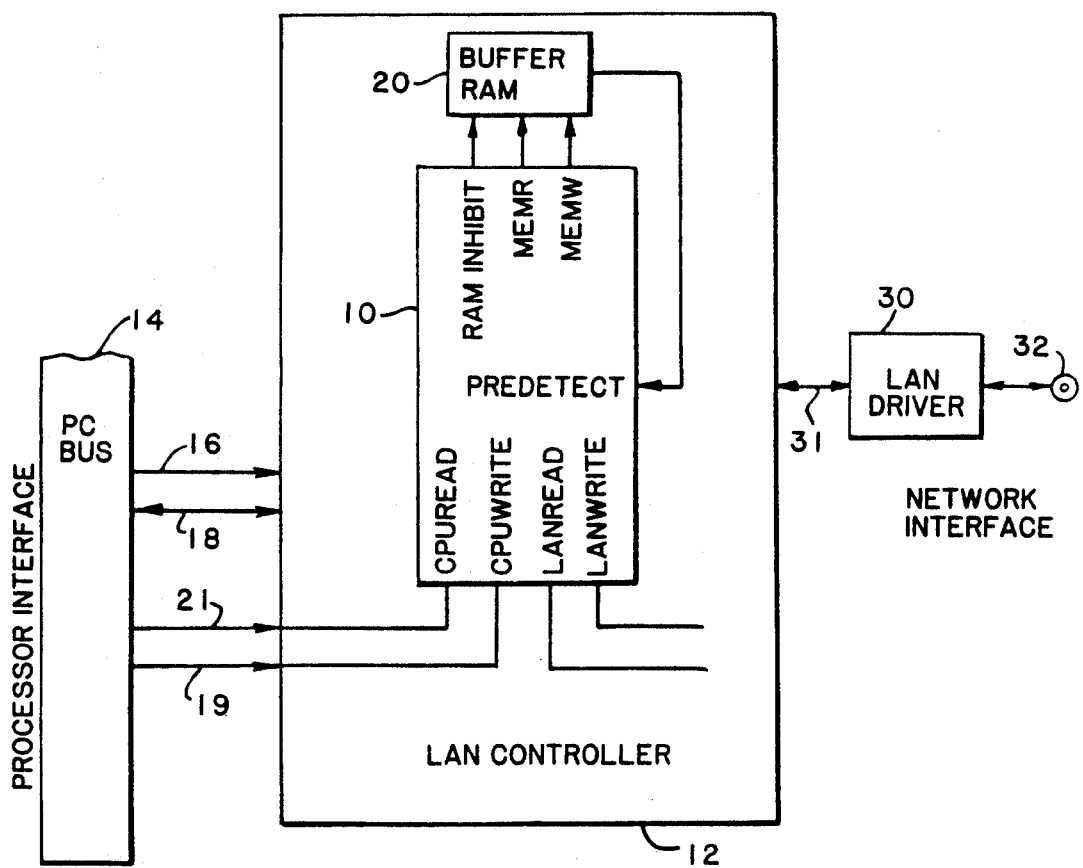
FIG. 1 is a schematic block diagram of a LAN controller coupled to a PC bus and a LAN driver, in which the LAN controller includes the novel arbitration circuit of the invention.

The arbitration circuit of the invention generally designated 10 is shown in the embodiment of FIG. 1 as included within a LAN controller 12. Controller 12 is connected to a CPU or processor (not shown) via a PC bus 14 by means of an address bus 16 and a data bus 18. The controller receives via PC bus 14 read and write command signals CUPREAD and CUPWRITE from the processor on input lines 21 and 19, respectively.

The LAN controller 12 has incorporated therein a buffer memory 20, which typically includes a static RAM. As described below, the arbitration circuit 10 generates a memory write signal MEMW, a memory read signal MEMR, and a memory inhibit RAMINHIBIT signal, which are applied to the buffer memory 20. The controller 12 contains, as is conventional, its own internal address and data bus (not shown), which are multiplexed with those of the processor under an arbitrator or control (also not shown).

The LAN controller 12 is coupled to other processors in the network by means of a network interface that includes, as shown in FIG. 1, a LAN driver 30 connected to a cable 32 to which other processors in the network are connected. The line 31 is a bidirectional interface between the LAN driver 30 and the LAN controller 12.

In accordance with the present invention, the arbitration circuit 10 provides more efficient arbitration or control of access to the shared buffer memory 20 to and from the processor and to and from the controller. Namely, the arbitration circuit 10 allows the processor to have access to the buffer memory without waiting by giving the processor absolute priority to the buffer memory and by postponing or denying access to the buffer memory by the controller until processor access to the memory has been completed. The processor thus unconditionally gains access to the memory when it provides either a CPUWRITE or CPUREAD signal to the arbitration circuit whenever it seeks, respectively, to write data into or read data from the memory.

Figure 2:
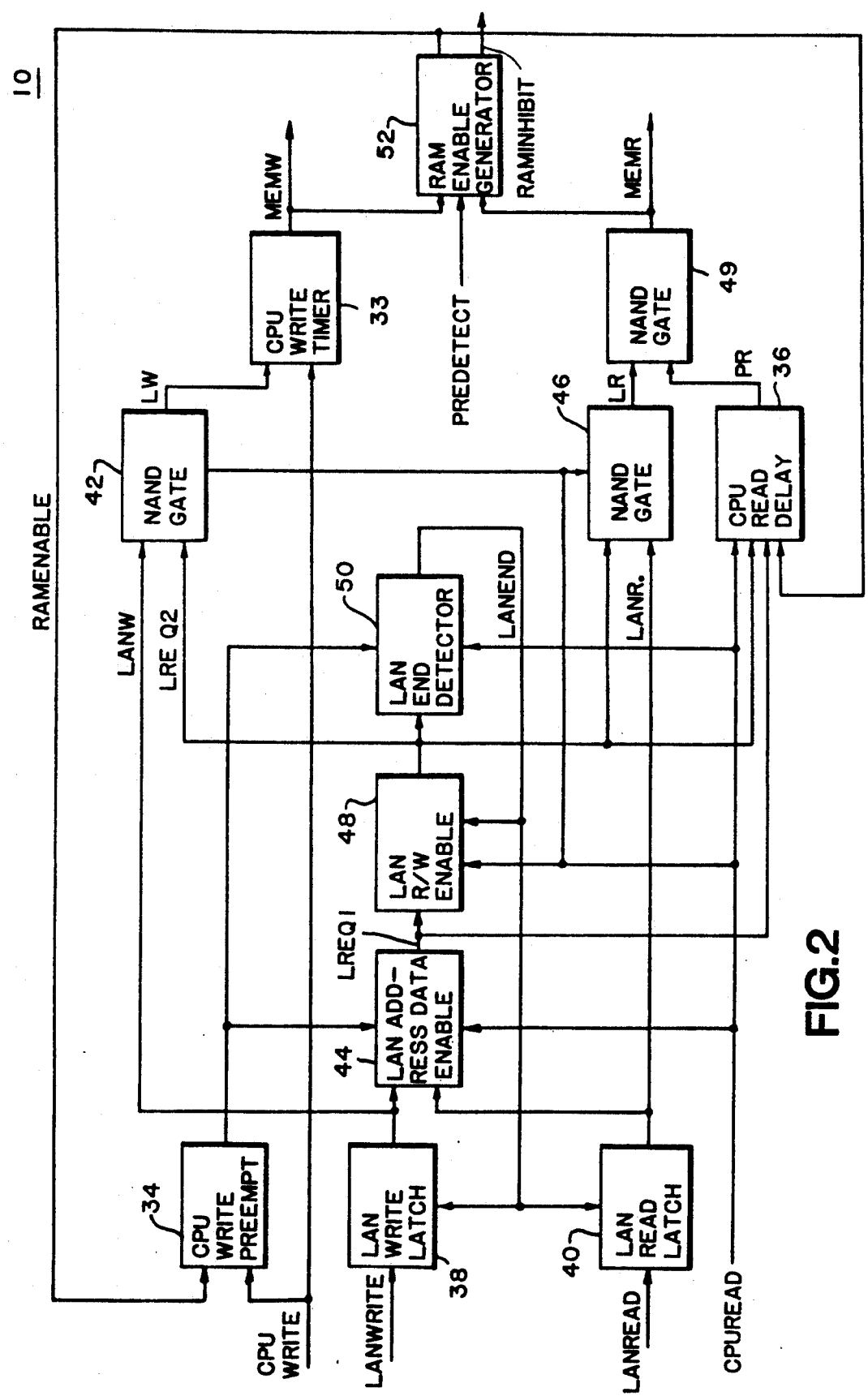
FIG. 2 is a schematic and functional block diagram of the novel memory access arbitration circuit of the invention.

As shown in FIG. 2, the arbitration circuit 10 includes a CPU write timer 33, which receives the CPUWRITE signal from the processor during a request for access from the processor to write new data into the memory. Write timer 33, as described in greater detail below, produces at its output the MEMW signal which is delayed from the trailing edge of the CPUWRITE pulse by the duration of an internal clock pulse so as to ensure the validity of the input data. The CPUREAD signal is applied to one input of a CPU read delay 36, whenever the processor requests access to read data from the memory.

The controller write signal LANWRITE and the controller read signal LANREAD are generated internally in the LAN controller 12 upon receipt of an instruction from the controller either to respectively write data into, or read data from, the buffer memory 20. The LANWRITE signal is applied to an input of a LAN write latch 38 and the LANREAD signal is applied to an input of a LAN read latch 40.

The output of latch 38, the LANW signal, is applied to one input of a NAND gate 42 and to one input of a LAN address data enable circuit 44. The output of LAN read latch 40, the LANR signal, is applied to another input of data enable circuit 44 and to one input of a NAND gate 46.

The output of data enable circuit 44, the LAN request or LREQ1 signal, is applied to an input of a LAN R/W enable circuit 48 and to a second input of CPU read delay circuit 36. The output of enable circuit 48, the LREQ2 signal, is applied to an input of LAN end detector 50, to a second input of NAND gate 42, to a second input of NAND gate 46, and to an input of CPU read delay 36. The output of LAN end detector 50, the LANEND signal, is coupled to the reset terminals of latches 38 and 40 and of enable circuit 48.

The output of gate 42, the LW signal, is applied to the second input of CPU write timer 33, the output of which, as noted, is the MEMW signal, the latter being time delayed from the trailing edge of the CPUWRITE input pulse to ensure the validity of data at the time of the MEMW signal during a write access request from the processor. The output of NAND gate 46, the LR signal, and the output of CPU read delay 36, the PR signal, are applied to the inputs of NAND gate 49, the output of which is the MEMR signal. As noted, the MEMW and MEMR signals are applied to the buffer memory to carry out either a write or read operation in the memory.

The output of CPU write preempt circuit 34 is applied to the reset terminals of data enable circuit 44, R/W enable circuit 48, and LAN end detector 50. The CUPREAD signal is also applied to the reset terminals of these circuits such that each is reset or cleared upon the application of either a CPUWRITE or CPUREAD signal to the arbitration circuit.

A PREDETECT signal is generated in the static RAM 22 when all columns in the RAM are precharged. The PREDETECT signal along with the MEMW and MEMR signals from gates 33 and 49, respectively, are applied to the inputs of a RAM enable generator 52. When the PREDETECT signal is present and neither the MEMW or MEMR signal is present the generator 52 develops the RAMINHIBIT signal, which is applied to the RAM 20 in the period between access times to allow the RAM to precharge its internal states. When either a MEMW or MEMR signal is present and the PREDETECT signal is not present, generator 52 produces the RAMINHIBIT signal as well as the RAMENABLE signal. The latter is applied to one input of CPU write preempt circuit 34 and to an input of CPU read delay 36.

The arbitration circuit 10 of FIG. 2 processes the LANWRITE and LANREAD signals, which indicate requests from the LAN controller to write data into and to read data from the memory, respectively, and the CPUWRITE and CPUREAD signals, the processor requests to write and read data into and from the memory, respectively, to generate the memory request signals MEMR and MEMW. The latter, when generated by the arbitration circuit, are applied to the buffer memory as read and write signals for either a processor— or a LAN controller-generated request. On all occasions, priority of memory access for either a read or write operation is given to a read or write request from the processor even if that should occur during a controller read or write request.

The operation of the arbitration circuit 10, which achieves this result, is first described as responding to a read or write request from the LAN controller in the absence of a request for memory access from the processor. The leading edge of the LANWRITE signal input signal is latched in write latch 38 to initiate a memory write operation in response to a write request from the LAN controller. By thus latching the leading edge of the LANWRITE signal, the duration of the LANWRITE signal does not determine the timing of the ensuing memory write operation. The latched LANWRITE input is referred to as LANW.

Similarly the leading edge of the LANREAD input signal is latched in read latch 40 in order to initiate a memory read operation responding to a LAN controller request to read data from the memory. By thus latching the leading edge of the LANREAD signal, the duration of the LANREAD signal does not determine the timing of the ensuing memory read operation. The latched LANREAD input signal is referred to as LANR.

The LANR or LANW signal is shaped in data enable circuit 44 to create a LAN request signal LREQ1, which remains valid until the end of a LAN controller read or write cycle. The LREQ1 signal functions to provide memory address and data with appropriate set up and hold times in relation to the MEMW signal output and to provide memory address with appropriate set up and hold times in relation to the MEMR signal output.

The LREQ1 signal is shaped in R/W enable circuit 48 to create a second LAN request signal LREQ2 delayed from the LREQ1 signal. The duration of the LREQ2 signal is set to be adequate to read data from or write data into the memory. The amount of time by which the LREQ1 precedes LREQ2 relates to the address and data set up time and is set to be adequate for the particular memory used with the arbitration circuit.

The LREQ2 signal is processed in LAN end detector 50 to generate the LANEND signal which is applied to the reset terminals of latches 38, 40, and enable circuit 48, thereby to clear those circuits and terminate a LAN controller read or write cycle. The LANEND signal clears latches 38, 40 of their latched condition and subsequently causes the trailing edge of the LREQ1 pulse. Only the LANEND signal, whose presence indicates the completion of a LAN controller read or write cycle, can clear latches 38 and 40, which remain cleared until the next leading edge of a LANWRITE or LANREAD signal. The LANEND signal also causes the trailing edge of the LREQ2 signal to occur before that of the LREQ1 signal to ensure adequate address and data hold times for the particular memory used with the arbitration circuit.

When the arbitration circuit is to service a processor read or write request during a controller read or write cycle, the enable circuits 44 and 48 and detector circuit 50 are cleared upon the occurrence of a CPUWRITE or a CPUREAD request signal from the processor, thereby preempting any controller-initiated read MEMR or write MEMW operation that may already be in process. These circuits remain cleared for the entire duration of the processor cycle thereby assuring inactive LREQ1, LREQ2 and LANEND signals during this time. Latches 38 and 40 are not cleared upon this occurrence, so that the preempted MEMR or MEMW signal will restart upon completion of the processor cycle and the resumption of a controller cycle.

In the case of a CPUWRITE input, indicating a processor write request, the trailing edge of the RAMENABLE signal generated at the output of RAM enable generator 52 releases this clear. In order to provide adequate address and data setup time to the buffer memory, CPU write timer 33 produces a MEMW pulse upon receiving the trailing edge of CPUWRITE. Therefore, the address and data bits have until the trailing edge of the CPUWRITE signal to set up. They remain valid until the trailing edge of the RAMENABLE signal, which is not released until the trailing edge of the MEMW signal. Thus the entire duration of a processor write cycle is from the leading edge of the CPUWRITE signal to the trailing edge of the MEMW-generated RAMENABLE signal. CPU write preempt circuit 34 produces a signal which clears enable circuits 44, 48 and detector 50 upon the leading edge of the CPUWRITE signal and releases the clear at the trailing edge of the RAMENABLE signal.

The presence of a CPUREAD signal, indicating a processor read request, resets enable circuits 44 and 48, detector 50, and gates 42 and 46 for the entire duration of the CUPREAD signal. After a CPUREAD signal has terminated or preempted the LAN controller cycle by clearing or resetting these circuits, CPU read delay 36 produces a PR signal to gate 49 to produce a new MEMR pulse corresponding to the processor read request. CPU read delay 36 cannot produce the PR signal until the trailing edge of the previous RAMENABLE signal, thereby assuring that the LAN controller cycle has been shut down. This also assures that a processor read cycle, which interrupts a LAN controller cycle, will have adequate address setup time.

Gate 49 also creates the MEMR signal when it receives an LR signal from gate 46 during a controller read request in the absence of a processor read request. Enable generator 52 receives a PREDETECT input from a circuit associated with the static RAM, not otherwise disclosed in this application, which senses when the internal states of the static RAM have been precharged. During this period of inactivity when the RAMINHIBIT signal is active, the internal states of the static RAM are precharged.

The PREDETECT signal is applied to RAM enable generator 52 to ensure that this period of inactivity has occurred. The period of inactivity lasts only as long as is needed to precharge the particular static RAM. The MEMW and MEMR signals terminate a RAMINHIBIT output when the PREDETECT signal is active. If the MEMW or MEMR signal occurs while the PREDETECT signal is inactive, generator 52 waits until the leading edge of the PREDETECT signal before it terminates the RAMINHIBIT signal. The PREDETECT signal is necessary only when a processor read request interrupts a LAN controller cycle.

If a CPUREAD or CPUWRITE signal indicating a processor read or write request interrupts a LAN controller cycle before the LANEND signal is generated, then the LANR or LANW signal remains latched. Following the completion of a processor request, a LAN controller read or write cycle can then resume with the generation of the LREQ1 and LREQ2 LAN request signals and the LANEND signal, and produces either a MEMR or MEMW signal as described above for an uninterrupted LAN controller cycle. As noted, the amount of time by which the LREQ1 signal precedes the LREQ2 signal is enough to precharge the static RAM.

When gate 42 receives both the LANW and LREQ2 signals at its inputs it generates the LW signal at its output, which is applied to one input of CPU write timer 33. The latter then generates a MEMW signal upon the leading edge of the LW signal. Similarly, for a LAN controller read request, gate 46 produces an LR signal when it receives both the LANR and LREQ2 signals at its inputs, and gate 49 produces a MEMR signal when it receives the LR signal from gate 46, and the PR signal from delay 36. It will be appreciated that although gates 42, 46, and 49 are implemented in the embodiment of the invention as NAND gates, they in actuality operate as AND gates since in this embodiment an output signal from these gates is considered active when it is low.

Both the MEMW and MEMR signals are of adequate duration, as determined by the duration of the LREQ2 signal, to ensure adequate write and read access to the buffer memory used with the arbitration circuit. RAM enable generator 52 generates the RAMINHIBIT and RAMENABLE output signals from either the MEMR or MEMW signal. The RAMINHIBIT signal is applied to the memory to disable its internal reads and writes. When the RAMINHIBIT signal is active, the internal states of the buffer memory are precharged.

It will be understood from the foregoing description of the arbitration circuit illustrated in FIG. 2 that a processor read or write request will unconditionally have priority over a read or write request from the controller and that a processor read or write request will interrupt or preempt an ongoing LAN controller read or write request and proceed until its completion, thereafter allowing the interrupted controller read or write request to resume.

Figure 3:
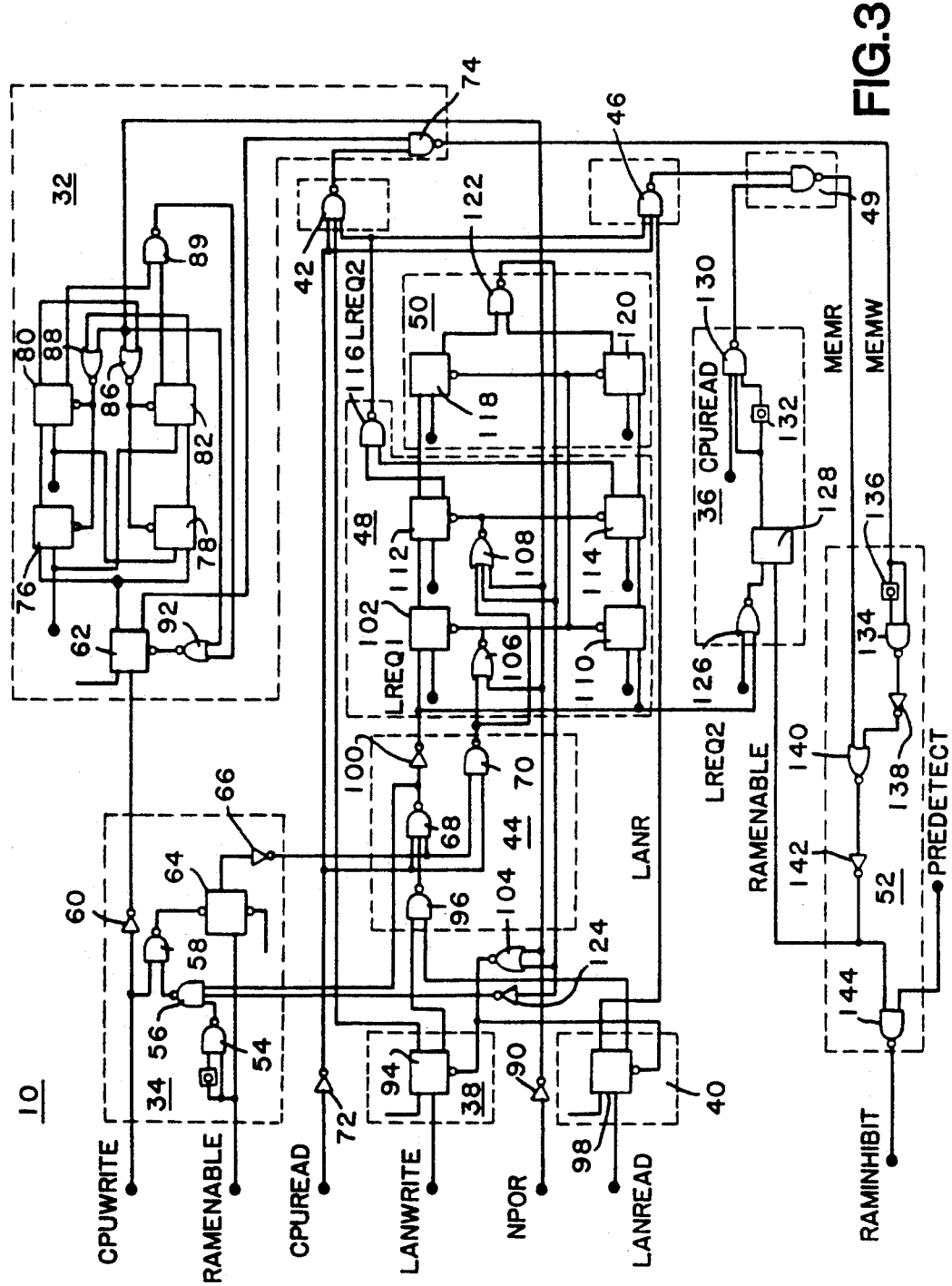
FIG. 3 is a more detailed schematic diagram of the arbitration circuit of FIG. 2.

As shown in FIG. 3, the CPU preempt circuit 34 includes a NAND gate 54, which receives the RAM ENABLE signal delayed and undelayed at its inputs and provides an output to an input of NAND gate 56. The output of gate 56 is applied to an input of NAND gate 58, which receives the CPUWRITE signal at its other input. The CPUWRITE signal is inverted in an inverter 60 and is applied to a flip-flop 62 in CPU write timer 33. The RAMENABLE signal is also applied to a clock input of a flip-flop 64, which receives a set input from the output of gate 58. The output of flip-flop 64 is inverted in an inverter 66 and applied to the input of NAND gates 68 and 70. The CPUREAD signal is inverted in an inverter 72 and applied to second inputs of gates 70, 68 as well as to one input of NAND gates 42 and 46. The output of gate 42, the LW signal, is applied to one input of NAND gate 74 in CPU write timer 33. The other input of gate 74 receives the output of flip-flop 62 which is a CPU generated write signal time delayed from the CPUWRITE signal.

To this end, an output of flip-flop 62 is applied to the inputs of a first pair of flip-flops 76, 80, and to the inputs of a second pair of flip-flops 78, 82, depending on the state of the clock pulses applied to the clock terminal of those flip-flops. The outputs of flip-flop 80 are applied to an input of a NAND gate 89 and a NOR gate 86, the output of which is applied to the reset terminals of flip-flops 78 and 82. The outputs of flipflop 82 are applied to the other input of gate 89 and to an input of a NOR gate 88, the output of which is applied to the reset terminals of flip-flops 76 and 80. A reset signal NPOR, which is active at power on, is inverted in an inverter 90 and applied to the other inputs of NOR gates 86, 88 and to an input of a NOR gate 92. The output of gate 89 is applied to the other input of gate 92, whose output is applied to the reset terminal of flipflop 62.

The LANWRITE signal is applied to a clock input of flip-flop 94 in latch 38. One output of flip-flop 94 is applied to an input of NAND gate 42 and another of its outputs is applied to an input of NAND gate 96 in enable circuit 44. The LANREAD signal is applied to a clock input of a flip-flop 98, which has one output applied to the other input of gate 96, and a second output applied to an input of gate 46. The output of gate 96 is applied to an input of gate 68, the output of which is inverted in an inverter 100 and then applied to an input of a flip-flop 102 in R/W enable circuit 48.

The inverted NPOR initialization signal is also applied to an input of NOR gate 104, NOR gate 106, and NOR gate 108. The output of gate 70 is applied to the other inputs of NOR gates 106 and 108. The output of NOR gate 106 is applied to the reset terminal of flip-flop 102 and flip-flop 110, and the output of NOR gate 108 is applied to the reset terminals of flip-flops 112, 114.

The outputs of flip-flop 112 are respectively applied to an input of a NAND gate 116 and a flip-flop 118 in LAN end detector 50. The outputs of flip-flop 114 are respectively applied to the other input of gate 116 and an input of flip-flop 120. The outputs of flip-flop 118, 120 are applied to the inputs of a NAND gate 122, the output of which is the LANEND signal. That signal is in turn inverted in an inverter 124 and applied to an input of NAND gate 56 in CPU write preempt circuit 34. The LANEND signal is also applied through NOR gate 104 to the reset terminal of flip-flop 94, 98 and LANEND signal is applied to an input of NAND gate 108, the output of which is connected to the reset terminals of flip-flops 112 and 114.

The output of inverter 100 is also applied to one input of a NOR gate 126 in CPU read delay 36. The other input to gate 126 is the LREQ2 signal developed at the output of gate 116. The output of gate 126 is applied to an input of a latch 128. The output of latch 128 is applied to an input of NAND gate 130 and through a delay 132 to a second input of gate 130. The third input to gate 130 receives the CPUREAD signal. The output of gate 130, the PR signal, is applied to an input of gate 49. The output of gate 46, the LR signal is applied to the other input of gate 49.

The output of gate 74, the MEMW signal, is applied to an input of NAND gate 134 and delayed by a delay cell 136 to the other input of gate 134. The output of gate 134 is inverted in an inverter 138 and applied to one input of a NOR gate 140, the other input of which is the MEMR signal from the output of gate 49. The output of gate 140 is inverted in an inverter 142. That inverted signal, the RAMENABLE signal, is applied to latch 128 in delay circuit 36, and to an input of NAND gate 144, the other input to which is the predetect signal. The output of gate 144 is the RAMINHIBIT signal.

It will be appreciated from the foregoing description of a preferred embodiment of the present invention, that the arbitration circuit described provides significant improvement in buffer memory access times as compared to conventional network controllers using a shared external static RAM. The buffer memory may be implemented as a single port static RAM while achieving performance that is equivalent to a more costly dual port static RAM. In addition, the single port static RAM may be more readily fabricated on the same monolithic integrated circuit as the LAN controller. In an arbitration circuit according to the invention that was incorporated into a controller and in which the static RAM buffer memory was fabricated on the same chip as the LAN controller, the time for an uncontested processor access to the on-chip static RAM memory was typically 40 ns and the access time when the processor preempted a LAN controller cycle was typically 70 ns, as compared to 400 ns and 1400 ns respectively required in a conventional LAN controller arbitration scheme. As compared to the conventional approach, the arbitration circuit of the present invention makes processor access time a function of the buffer memory access and cycle time, which will result in even greater improvement in performance as the speeds of static RAMs improve.

It will also be appreciated that although the present invention has been described with respect to a presently preferred embodiment, modifications to the described embodiment may be made without departing from the spirit and scope of the invention as set forth in the appended claims.

What is claimed is:

1. An access arbitration circuit for use with a local area network controller associated with a processor and a memory associated with the processor, said arbitration circuit being effective to establish priority of access between the controller and processor to the memory, said arbitration circuit comprising input means for receiving requests for memory access from the controller and from the processor, logic means coupled to said input means for unconditionally interrupting access to said memory from the controller upon the onset of a request from the processor for access to the memory, and means for temporarily storing a signal indicating a request for access to the memory from the controller for the period of the processor request.

2. The arbitration circuit of claim 1, in which said logic means further comprises means for automatically resuming a previously interrupted controller-requested read or write operation upon the completion of a processor memory access request.

3. The arbitration circuit of claim 2, in which said logic means comprises a plurality of input stages placed in an active state in response to a controller read or write request, and means for resetting said input stages to an inactive state upon the receipt of a processor request for memory access.

4. The arbitration circuit of claim 3, further comprising gating means coupled to said logic means for generating a read or write instruct to the memory in response respectively to a controller or processor read or write request.

5. The arbitration circuit of claim 1, further comprising means for generating a memory inhibit signal active in the period between processor and controller access times to allow said memory to precharge to its internal state.

6. The arbitration circuit of claim 1 further comprising means for delaying a processor write access signal to ensure valid data at the occurrence of a processor write access signal.

* * * * *